US012693575B2

(12) United States Patent
    Huang

(10) Patent No.: US 12,693,575 B2
(45) Date of Patent: Jul. 28, 2026

(54) VARIABLE APERTURE, CAMERA MODULE, AND ELECTRONIC DEVICE

(71) Applicant: VIVO MOBILE COMMUNICATION CO., LTD., Guangdong (CN)

(72) Inventor: Wei Huang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 190 days.

(21) Appl. No.: 18/604,896

(22) Filed: Mar. 14, 2024

(65) Prior Publication Data

US 2024/0219808 A1     Jul. 4, 2024

Related U.S. Application Data

(63) Continuation of application No. PCT/CN2022/118783, filed on Sep. 14, 2022.

(30) Foreign Application Priority Data

Sep. 16, 2021     (CN) .......................... 202111087937.3

(51) Int. Cl.
    *G03B 9/02*          (2021.01)
    *G02B 26/00*         (2006.01)
(52) U.S. Cl.
    CPC ............. *G03B 9/02* (2013.01); *G02B 26/004* (2013.01)
(58) Field of Classification Search
    CPC ................................... G03B 9/02; H04N 23/56
    See application file for complete search history.

(56) References Cited

U.S. PATENT DOCUMENTS 5,960,217 A * 9/1999 Goto ...................... G03B 7/097
                                                        396/257
2006/0044448 A1* 3/2006 Kato ...................... H04N 23/68
                                                        348/335

(Continued)

FOREIGN PATENT DOCUMENTS

CN        101669059 A      3/2010
CN        101988984 A      3/2011

(Continued)

*Primary Examiner* — Noam Reisner
(74) *Attorney, Agent, or Firm* — Price Heneveld LLP

(57) ABSTRACT

This application provides a variable aperture, a camera module, and an electronic device. The variable aperture includes a first light-transmitting substrate, a second light-transmitting substrate, light-transmitting fluid, light-shielding fluid, a driving mechanism, and a first light-supplementing element. The first light-transmitting substrate and the second light-transmitting substrate are disposed opposite to each other. A sealed chamber is disposed between the first light-transmitting substrate and the second light-transmitting substrate. The light-transmitting fluid and the light-shielding fluid are fluidly provided in the sealed chamber, and the light-transmitting fluid and the light-shielding fluid are immiscible with each other. The light-transmitting fluid and the light-shielding fluid are used to form a light-transmitting region and a light-shielding region, and the light-shielding region is disposed around the light-transmitting region. The driving mechanism is configured to drive the light-transmitting fluid and the light-shielding fluid to flow.

20 Claims, 4 Drawing Sheets

(56)                    References Cited

U.S. PATENT DOCUMENTS

2007/0133975  A1*   6/2007   Lin ........................ H04N 23/56
                                                           396/428
2007/0286597  A1   12/2007   Hopper
2009/0033863  A1    2/2009   Blum et al.
2010/0294920  A1   11/2010   Huang et al.
2013/0016515  A1*   1/2013   Chang ..................... G03B 9/02
                                                           362/293
2013/0306480  A1   11/2013   Chang et al.
2014/0240586  A1    8/2014   Lee et al.
2017/0078543  A1*   3/2017   Lee .................... H04M 1/0264
2020/0050013  A1    2/2020   Rhee et al.
2021/0302803  A1    9/2021   Chen et al.

FOREIGN PATENT DOCUMENTS

CN          102879899  A      1/2013
CN          104618661  A      5/2015
CN          204856002  U     12/2015
CN          110501828  A     11/2019
CN          110609380  A     12/2019
CN          110716369  A      1/2020
CN          110830687  A      2/2020
CN          111726510  A      9/2020
CN          112368609  A      2/2021
CN          113376929  A      9/2021
CN          113759635  A     12/2021
EP            2546691  A1     1/2013
GB            1494182  A     12/1977
WO         2007068761  A1     6/2007

* cited by examiner

VARIABLE APERTURE, CAMERA MODULE, AND ELECTRONIC DEVICE

CROSS-REFERENCE TO RELATED APPLICATIONS

The present application is a Bypass continuation application of PCT International Application No. PCT/CN2022/118783 filed on Sep. 14, 2022, which claims priority to Chinese Patent Application No. 202111087937.3, filed with the China National Intellectual Property Administration on Sep. 16, 2021 and entitled "VARIABLE APERTURE, CAMERA MODULE, AND ELECTRONIC DEVICE", which are incorporated herein by reference in their entireties.

TECHNICAL FIELD

This application belongs to the technical field of communication devices, and in particular, relates to a variable aperture, a camera module, and an electronic device.

BACKGROUND

For a camera module, a variable aperture is configured to control an amount of entered light and a depth of field of the camera module, to meet different shooting requirements. A large aperture allows a large amount of entered light. A main part of an image shot in a large aperture mode has relatively high quality, and an edge of the image has relatively poor quality. A small aperture allows a small amount of entered light. A blurred degree of a main part and a background in an image shot in a small aperture mode is relatively low, which can improve a problem of poor quality of the edge of the image shot in the large aperture mode.

However, because the small aperture allows the small amount of entered light, the shot image has low definition. In addition, in the small aperture mode, close-up photography or macro photography is usually performed, a lens is close to a photographed object, and the camera module has a specific light shielding effect. As a result, an overall shooting environment is dark, and the amount of entered light is further reduced in the small aperture mode, so that the shot image has low definition, and image quality is poor.

SUMMARY

Embodiments of this application are intended to provide a variable aperture, a camera module, and an electronic device.

This application is implemented as follows.

According to a first aspect, the present invention discloses a variable aperture, including a first light-transmitting substrate, a second light-transmitting substrate, light-transmitting fluid, light-shielding fluid, a driving mechanism, and a first light-supplementing element.

The first light-transmitting substrate and the second light-transmitting substrate are disposed opposite to each other, and a sealed chamber is disposed between the first light-transmitting substrate and the second light-transmitting substrate. The light-transmitting fluid and the light-shielding fluid are fluidly provided in the sealed chamber, and the light-transmitting fluid and the light-shielding fluid are immiscible with each other. The light-transmitting fluid and the light-shielding fluid are used to form a light-transmitting region and a light-shielding region, and the light-shielding region is disposed around the light-transmitting region.

The driving mechanism is configured to drive the light-transmitting fluid and the light-shielding fluid to flow. When the light-transmitting fluid and the light-shielding fluid flow, an area of the light-transmitting region and an area of the light-shielding region may be changed.

In a case that the area of the light-transmitting region is less than a preset area, the first light-supplementing element emits light.

According to a second aspect, the present invention further discloses a camera module, including a variable aperture, a lens, a driving motor, a photosensitive element, an optical filter, and a circuit board.

The variable aperture is disposed opposite to the lens, the variable aperture is located on a light inlet side of the lens, and the variable aperture is the foregoing variable aperture.

The lens is connected to the driving motor, the driving motor can drive the lens to move in a direction of an optical axis of the lens, and the driving motor is electrically connected to the circuit board.

A photosensitive surface of the photosensitive element is disposed opposite to the lens, and the photosensitive element is electrically connected to the circuit board.

The optical filter is disposed between the lens and the photosensitive surface of the photosensitive element.

According to a third aspect, the present invention further discloses an electronic device, including the foregoing camera module.

REFERENCE NUMERALS

110—first light-transmitting substrate, 120—second light-transmitting substrate, 130—light-transmitting partition, 131—first through hole, 140—first sealing structural member, 150—second sealing structural member,
210—light-transmitting fluid, 220—light-shielding fluid,
300—first light-supplementing element,
400—photocell,
510—first flow channel, 520—second flow channel,
600—coil, 610—power supply, 620—coil wire, 630—power supply carrier,
700—light-transmitting cover plate,
800—protective structural member,
910—lens, 920—driving motor, 930—photosensitive element, 931—photosensitive element wire, 940—optical filter, 950—circuit board, 960—optical filter support, 970—base.

DESCRIPTION OF EMBODIMENTS

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in a proper circumstance, so that the embodiments of this application can be implemented in an order other than the order illustrated or described herein. Objects classified by "first", "second", and the like are usually of a same type, and the number of objects is not limited. For example, there may be one or more first objects.

Figure 1:
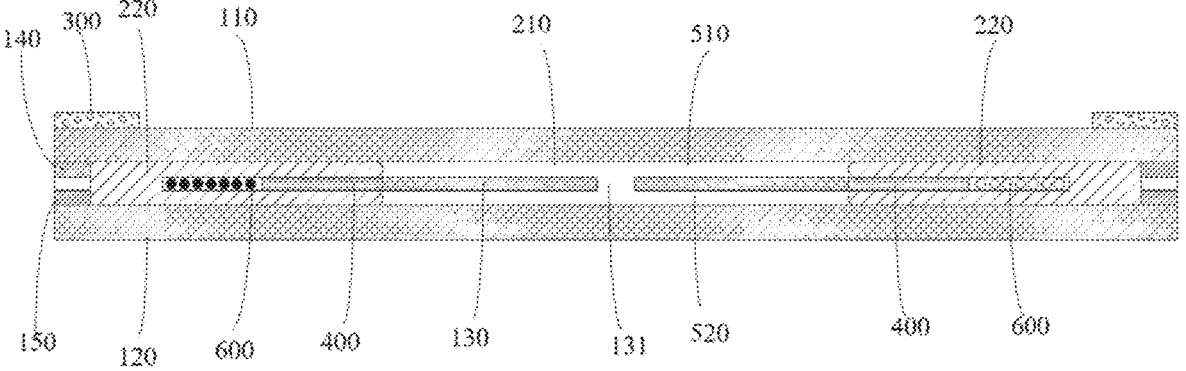
FIG. 1 is a schematic structural diagram of a variable aperture in a large aperture mode according to an embodiment of this application.
Figure 2:
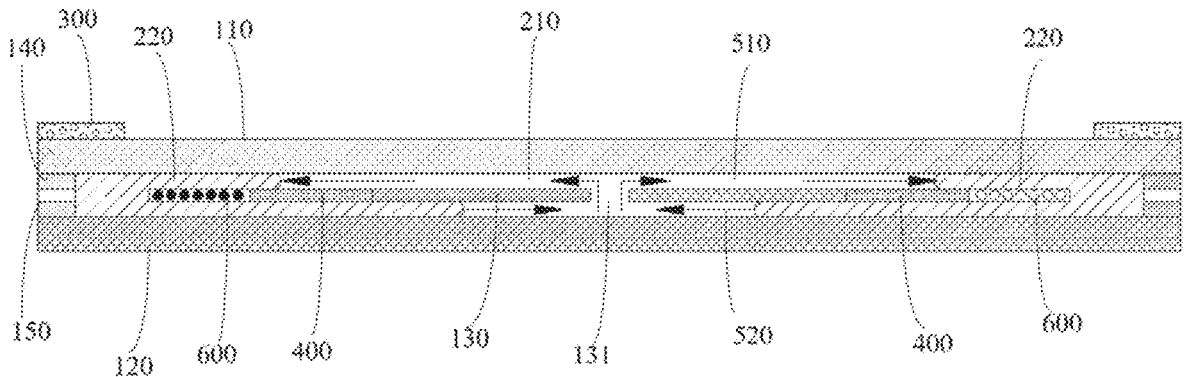
FIG. 2 is a schematic structural diagram of a variable aperture in a small aperture mode according to an embodiment of this application (directions of arrows are respectively a direction of light-transmitting fluid and a direction of light-shielding fluid that are respectively driven by driving forces)
Figure 3:
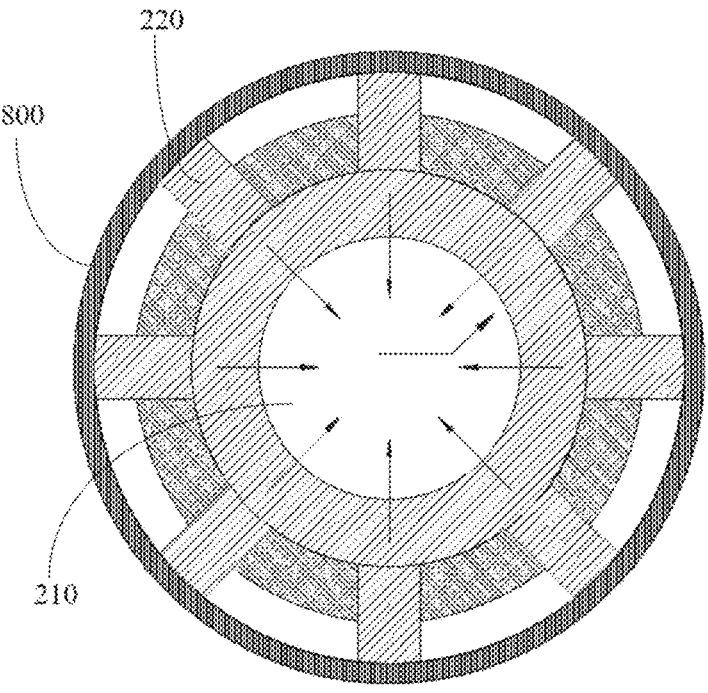
FIG. 3 is a top view of a variable aperture according to an embodiment of this application.
Figure 4:
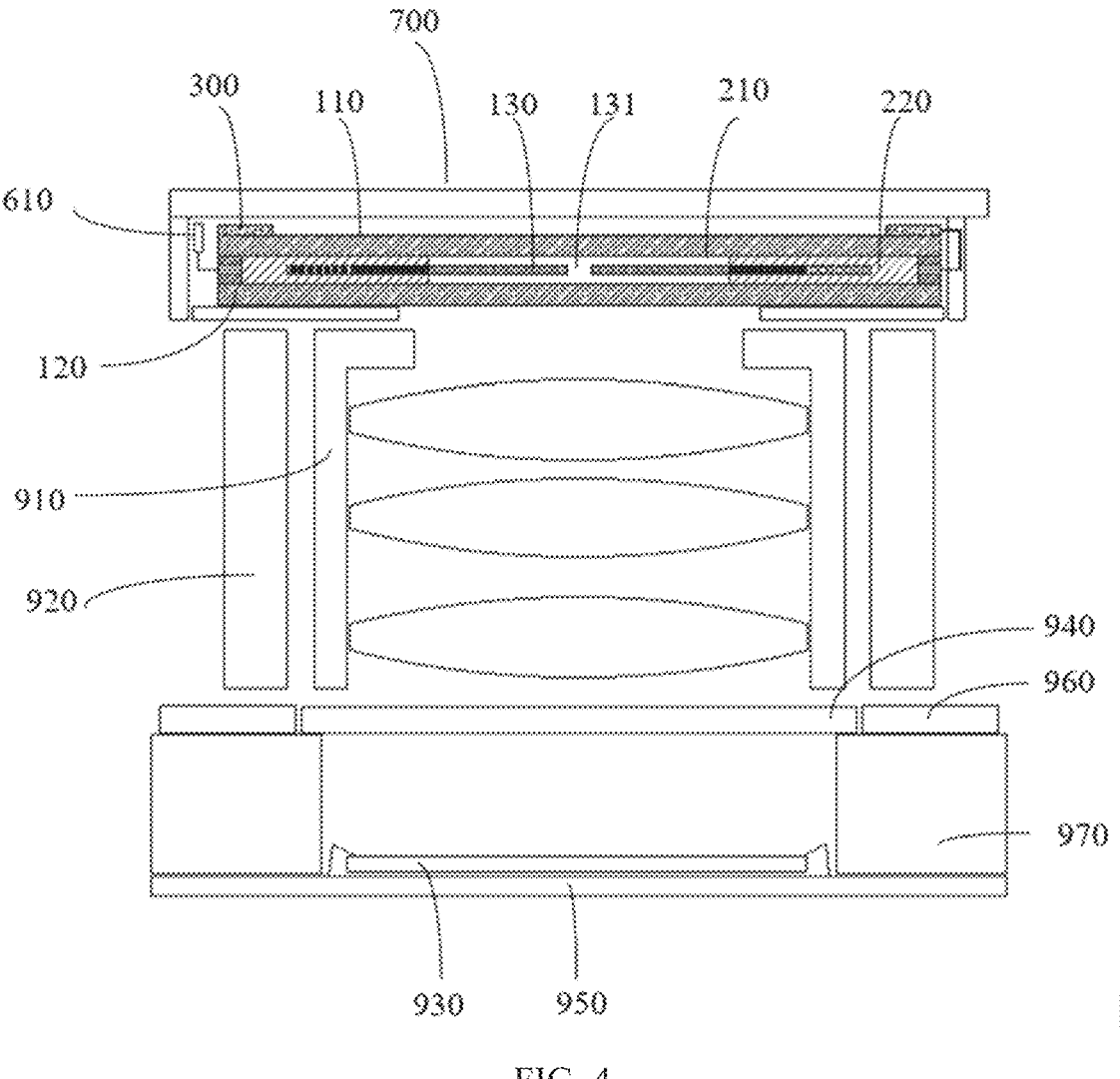
FIG. 4 is a schematic structural diagram of a camera module in a large aperture mode according to an embodiment of this application.
Figure 5:
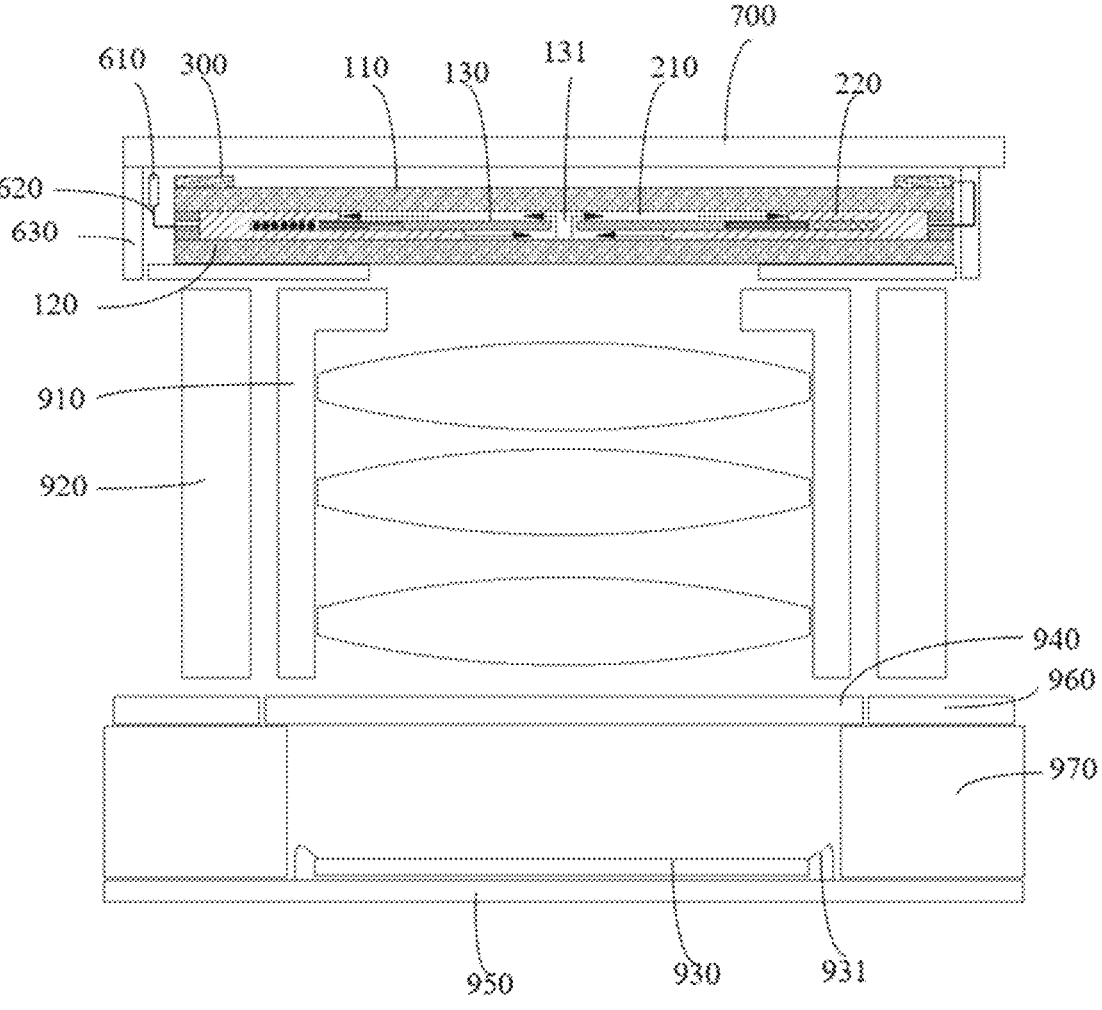
FIG. 5 is a schematic structural diagram of a camera module in a small aperture mode according to an embodiment of this application.

Refer to FIG. 1 to FIG. 5. Embodiments of this application disclose a variable aperture, and the disclosed variable aperture may be used in a camera module. The disclosed variable aperture includes a first light-transmitting substrate 110, a second light-transmitting substrate 120, light-transmitting fluid 210, light-shielding fluid 220, a driving mechanism, and a first light-supplementing element 300.

The first light-transmitting substrate 110 and the second light-transmitting substrate 120 are disposed opposite to each other. A sealed chamber is disposed between the first light-transmitting substrate 110 and the second light-transmitting substrate 120. The first light-transmitting substrate 110 and the second light-transmitting substrate 120 are light-transmitting structures, so that light can penetrate the first light-transmitting substrate 110 and the second light-transmitting substrate 120. Optionally, the first light-transmitting substrate 110 and the second light-transmitting substrate 120 may be transparent glass structural members or transparent resin structural members.

The light-transmitting fluid 210 and the light-shielding fluid 220 are fluidly provided in the sealed chamber, and the light-transmitting fluid 210 and the light-shielding fluid 220 are immiscible with each other. The light-transmitting fluid 210 and the light-shielding fluid 220 are used to form a light-transmitting region and a light-shielding region, and the light-shielding region is disposed around the light-transmitting region. Light can penetrate the light-transmitting fluid 210, and the light-transmitting fluid 210 may be transparent fluid. Light cannot penetrate the light-shielding fluid 220, and the light-shielding fluid 220 may be opaque fluid.

A part that is of the light-transmitting fluid 210 and that enables light to penetrate the first light-transmitting substrate 110, the light-transmitting fluid 210, and the second light-transmitting substrate 120 sequentially forms the light-transmitting region. That is, light-transmitting holes for light to penetrate the variable aperture are formed in the light-transmitting region. A size of the light-transmitting region is a size of the light-transmitting hole provided in the variable aperture, that is, a size of the aperture. Each region in which the light-shielding fluid 220 is located can block light from penetrating, and therefore each region in which the light-shielding fluid 220 is the light-shielding region.

In a case that the light-transmitting fluid 210 and the light-shielding fluid 220 do not flow, if a position at which the light-transmitting region is located and a size of the light-transmitting region are fixed, the size of the aperture is fixed. In a case that the light-transmitting fluid 210 and the light-shielding fluid 220 flow, if a position at which the light-transmitting region is located and a size of the light-transmitting region is changed, the size of the aperture also changes, thereby implementing adjustment of the size of the aperture.

The driving mechanism is configured to drive the light-transmitting fluid 210 and the light-shielding fluid 220 to flow. When the light-transmitting fluid 210 and the light-shielding fluid 220 flow, an area of the light-transmitting region and an area of the light-shielding region may be changed. That is, the light-transmitting fluid 210 and the light-shielding fluid 220 may be driven, by the driving mechanism, to flow in the sealed chamber, to implement adjustment of the size of the aperture.

In a case that the area of the light-transmitting region is less than a preset area, the variable aperture is in a small aperture mode, and the first light-supplementing element 300 emits light. In the small aperture mode, especially in the small aperture mode, and in case of close-up photography or macro photography, an ambient brightness is low, and light is supplemented by using the first light-supplementing element 300 to improve the ambient brightness, thereby increasing an amount of light penetrating the variable aperture, finally increasing definition of an image shot in the small aperture mode, and improving quality of the shot image.

When shooting is performed in the small aperture mode, close-up photography or macro photography is usually performed. If a light intensity of the first light-supplementing element 300 is extremely large, a shot image is overexposed. Therefore, a power and an intensity of the first light-supplementing element 300 are small, to prevent the shot image from being overexposed due to the extremely large light intensity. Optionally, the first light-supplementing element 300 may be a light-emitting strip.

In an embodiment of this application, the driving mechanism drives the light-transmitting fluid 210 and the light-shielding fluid 220 to flow, which can change the area of the light-transmitting region. The size of the light-transmitting region is the size of the aperture, that is, the driving mechanism drives the light-transmitting fluid 210 and the light-shielding fluid 220 to flow, thereby implementing adjustment of the size of the aperture. In addition, in a case that the area of the light-transmitting region is smaller than the preset area, the first light-supplementing element 300 emits light, which can improve a brightness of a shooting environment, thereby improving an amount of entered light in a small aperture shooting mode, and further improving quality of an image shot in the small aperture shooting mode. It can be learned that the variable aperture disclosed in this application can resolve a problem, in related technologies, of poor image quality due to a small amount of entered light when the camera module performs shooting in the small aperture mode.

To provide electric energy required for the first light-supplementing element 300 to emit light, in a case that the variable aperture is installed in the camera module, the first light-supplementing element 300 may be connected to the circuit board 950 of the camera module, and then the first light-supplementing element 300 is supplied with power and controlled by using the circuit board 950. However, adding of the first light-supplementing element 300 increases overall power consumption of the camera module. In a case that the camera module is installed in the electronic device, the overall power consumption of the camera module increases, so that a battery life of the electronic device becomes worse, and use experience of a user is affected.

To resolve the foregoing problem, the variable aperture disclosed in the embodiment of this application may further include a photocell 400, and the first light-supplementing element 300 is electrically connected to the photocell 400. Optionally, the photocell 400 may be a photovoltaic cell. The photocell 400 can convert solar energy into electrical energy to provide the first light-supplementing element 300 with the electrical energy required for light emission. In this case, the first light-supplementing element 300 does not need to consume additional electric power of the camera module, so that a problem of increase of the power consumption of the camera module due to adding of the first light-supplementing element 300 is prevented, and power consumption of the camera module is reduced. In addition, the photocell 400 supplies power to the first light-supplementing element 300, so that light energy incident in the camera module can be fully used, to play a role in reducing electric power energy.

The photocell 400 may be installed on a light-incoming surface of the variable aperture. For example, in a case that the first light-transmitting substrate 110 is located on a light-incoming side of the variable aperture, the photocell 400 may be installed on a surface of the first light-transmitting substrate 110. However, in this installation manner, a thickness of the variable aperture is increased, and a thickness of the camera module is further increased.

For this reason, in an embodiment disclosed in this application, the photocell 400 may be disposed in the sealed chamber, and the light-shielding fluid 220 may cover the photocell 400. When the light-shielding fluid 220 flows, a light-absorbing surface of the photocell 400 may be exposed outside the light-shielding fluid 220. In a case that the area of the light-transmitting region is smaller than the preset area, the photocell 400 is exposed outside the light-shielding fluid 220, and the photocell 400 receives ambient light to generate electric energy for the first light-supplementing element 300 to emit light. In this case, space of the sealed chamber can be fully used, and the thickness of the variable aperture can be effectively reduced.

In addition, if the light-shielding fluid 220 does not block the photocell 400, the photocell 400 is always exposed to external light, and related parts such as a control component need to be disposed to control the photocell 400, so that the photocell 400 receives the external light in the small aperture mode. In the embodiment disclosed in this application, as the area of the light-transmitting region decreases, that is, in a process in which a large aperture is switched to a small aperture, the photocell 400 is automatically exposed outside the light-shielding fluid 220, to supply power to the first light-supplementing element 300, without additional related parts such as the control component. Therefore, a quantity of parts used for the variable aperture is reduced, and costs are reduced.

The photocell 400 is disposed in the sealed chamber. To prevent a damage to the photocell 400 because an unnecessary reaction is generated between the light-transmitting fluid 210 and the light-shielding fluid 220 in the sealed chamber, and the photocell 400, in an embodiment disclosed in this application, the variable aperture may further include a first installation housing. The first installation housing is a light-transmitting structure, the photocell 400 may be disposed in the first installation housing. The first installation housing is disposed in the sealed chamber, and the first installation housing may be connected to the first light-transmitting substrate 110 or the second light-transmitting substrate 120.

In an embodiment disclosed in this application, the sealed chamber may include a first flow channel 510 and a second flow channel 520. The first flow channel 510 is close to the first light-transmitting substrate 110, and the second flow channel 520 is close to the second light-transmitting substrate 120. The first flow channel 510 is in connection with the second flow channel 520. The light-transmitting fluid 210 and the light-shielding fluid 220 may circularly flow between the first flow channel 510 and the second flow channel 520, to change positions at which the light-transmitting fluid 210 and the light-shielding fluid 220 are respectively located, and further change the size of the light-transmitting region, implementing adjustment of the size of the aperture. In this case, the first flow channel 510 and the second flow channel 520 limit flow paths and flow ranges of the light-transmitting fluid 210 and the light-shielding fluid 220, and play a role in guiding flowing of the light-transmitting fluid 210 and the light-shielding fluid 220, so that the size of the aperture is adjusted precisely.

There is a plurality of manners in which the first flow channel 510 and the second flow channel 520 are formed in the sealed chamber. In an optional embodiment, the variable aperture may further include a light-transmitting partition 130. The light-transmitting partition 130 is located between the first light-transmitting substrate 110 and the second light-transmitting substrate 120, and the first light-transmitting substrate 110, the light-transmitting partition 130, and the second light-transmitting substrate 120 may be arranged in parallel. A side, close to the first light-transmitting substrate 110, of the light-transmitting partition 130 forms the first flow channel 510. A side, close to the second light-transmitting substrate 120, of the light-transmitting partition 130 forms the second flow channel 520. The light-transmitting partition 130 may be a transparent glass structural member or a transparent resin structural member.

In the foregoing solution, the photocell 400 is disposed in the sealed chamber through the first installation housing. The first installation housing may be disposed on the first light-transmitting substrate 110 and the second light-transmitting substrate 120. The first installation housing may alternatively be disposed on the light-transmitting partition 130. The first installation housing is disposed on the light-transmitting partition 130, to better help install the first installation housing.

In a further technical solution, the variable aperture may further include a first sealing structural member 140 and a second sealing structural member 150. The first sealing structural member 140 is connected to the first light-transmitting substrate 110 and the light-transmitting partition 130 in a sealing manner. The first light-transmitting substrate 110, the first sealing structural member 140, and the light-transmitting partition 130 jointly form the first flow channel 510 in an enclosing manner. The second sealing structural member 150 is connected to the second light-transmitting substrate 120 and the light-transmitting partition 130 in a sealing manner. The second light-transmitting substrate 120, the second sealing structural member 150, and the light-transmitting partition 130 jointly form the second flow channel 520 in an enclosing manner. Optionally, the first sealing structural member 140 and the second sealing structural member 150 may be annular sealing rings.

To implement communication between the first flow channel 510 and the second flow channel 520, the light-transmitting partition 130 may be provided with a first through hole 131. The first through hole 131 is in connection with the first flow channel 510 and the second flow channel 520. The light-transmitting fluid 210 circularly flows between the first flow channel 510 and the second flow channel 520 through the first through hole 131. The light-transmitting partition 130 may further be provided with a second through hole. The second through hole is in connection with the first flow channel 510 and the second flow channel 520. The light-shielding fluid 220 circularly flows between the first flow channel 510 and the second flow channel 520 through the second through hole.

During assembly and use of the camera module, a center of the light-transmitting region needs to align with a center of a lens 910. To help align the center of the light-transmitting region with the center of the lens 910 of the camera module, in an embodiment of this application, the center of the light-transmitting region is located at a center of the variable aperture, and the light-shielding region is disposed around the light-transmitting region. In this case, the center of the light-transmitting region is located at the center of the variable aperture, that is, a center of an aperture is located at the center of the variable aperture. During installation of the camera module, it is required only that the center of the variable aperture is aligned with the center of the lens 910, which reduces an assembly difficulty for the camera module.

Specifically, the first through hole 131 may be disposed at the center of the variable aperture, and a plurality of second through holes may be disposed. The plurality of second through holes are disposed around the first through hole 131. The second through holes are arranged evenly at an interval in a circumferential direction of the light-transmitting partition 130, so that the center of the light-transmitting region is located at the center of the variable aperture, and the light-shielding region is disposed around the light-transmitting region.

In the foregoing solution, the driving mechanism is configured to drive the light-transmitting fluid 210 and the light-shielding fluid 220 to flow. There are a plurality of types of driving mechanisms. For example, the driving mechanism may include a first electrode and a second electrode. The first electrode may be disposed on a side, facing the sealed chamber, of the first light-transmitting substrate 110. The second electrode may be disposed on a side, facing the sealed chamber, of the second light-transmitting substrate 120. One of the light-transmitting fluid 210 and the light-shielding fluid 220 may be liquid metal. The first electrode and the second electrode can generate an electric field after being electrified, and an electric field force that can drive the liquid metal to flow is further generated, to drive the light-transmitting fluid 210 and the light-shielding fluid 220 to flow.

Of course, the driving mechanism may further be of another structure. In an embodiment disclosed in this application, the driving mechanism may be a coil 600. At least one of the light-transmitting fluid 210 or the light-shielding fluid 220 is magnetic fluid. In a case that the coil 600 is in an electrified state, the coil 600 magnetically cooperates with the magnetic fluid, to generate an electromagnetic force. The electromagnetic force drives the light-transmitting fluid 210 to flow into the first flow channel 510, and the electromagnetic force drives the light-shielding fluid 220 to flow into the second flow channel 520, to reduce an area of a region, perpendicular to a light incidence direction, in the light-transmitting region, that is, to reduce the size of the aperture, and further implement adjustment of the size of the aperture. In this case, the coil 600 is electrified to generate a magnetic field, and the magnetic fluid flows under an action of the magnetic field, thereby implementing adjustment of the size of the aperture.

For example, the light-shielding fluid 220 may be magnetic fluid. In a case that the coil 600 is electrified, the coil 600 generates the magnetic field, and the magnetic field generated by the coil 600 magnetically cooperates with the light-shielding fluid 220, to generate a magnetic field force that drives the light-shielding fluid 220 to flow into the second flow channel 520. In addition, because the first flow channel 510 and the second flow channel 520 are filled with the light-transmitting fluid 210 and the light-shielding fluid 220, when the light-shielding fluid 220 flows, the light-transmitting fluid 210 is squeezed, so that the light-transmitting fluid 210 flows into the first flow channel 510.

In addition, a different magnitude of the magnetic field force indicates a different position at which the magnetic fluid flows, and a size of a generated aperture may be controlled by controlling a magnitude of a current through the coil 600.

In the foregoing solution, in a case that the coil 600 is electrified, a direction of a force applied to fluid in the first flow channel 510 and a direction of a force applied to fluid in the second flow channel 520 are opposite to each other. To achieve this purpose, a direction of a current through a side, close to the first flow channel 510, of the coil 600 is opposite to a direction of a current through a side, close to the second flow channel 520, of the coil 600, so that a direction of a magnetic field force applied to the fluid in the first flow channel 510 and a direction of a magnetic field force applied to the fluid in the second flow channel 520 are opposite to each other, and the fluid in the first flow channel 510 and the fluid in the second flow channel 520 flow in different directions. Of course, in another embodiment, the variable aperture may alternatively include two coils 600, and directions of the currents through the two coils 600 are opposite to each other.

The coil 600 may be disposed on an outer surface of the first light-transmitting substrate 110 or the second light-transmitting substrate 120. However, a thickness of the variable aperture is increased in this disposing manner. For this reason, in an embodiment disclosed in this application, the coil 600 may be located in the sealed chamber, to reduce the thickness of the variable aperture.

Specifically, the variable aperture may further include a second installation housing. The second installation housing may be a light-transmitting structure, and the coil 600 may be disposed in the second installation housing. The second installation housing is disposed in the sealed chamber, and the second installation housing may be connected to the first light-transmitting substrate 110 or the second light-transmitting substrate 120. In the foregoing solution, the light-transmitting partition 130 is disposed in the sealed chamber, and the second installation housing may alternatively be connected to the light-transmitting partition 130. In this case, installation of the coil 600 can be implemented, and fluid can be separated from the coil 600, so that the coil 600 is protected.

To enable all parts of the magnetic fluid to bear an even force, in an embodiment disclosed in this application, the light-transmitting fluid 210 may be distributed in a circle, and the light-shielding fluid 220 is disposed around the light-transmitting fluid 210. Therefore, the light-shielding fluid 220 is distributed annularly, the light-transmitting fluid 210 and the light-shielding fluid 220 are disposed concentrically, the coil 600 may be disposed as an annular structure, and the coil 600 and the light-shielding fluid 220 are disposed concentrically. In this case, in a circumferential direction of the magnetic fluid, all parts of the magnetic fluid bear the even force and flow synchronously, to prevent a central position of the light-transmitting region from changing because all parts of the magnetic fluid bear uneven forces.

In a further technical solution, the light-shielding fluid 220 may cover the coil 600. In this case, light can be prevented from being blocked by the coil 600, space in the sealed chamber can be fully used, and a volume of the variable aperture can be reduced.

To supply power to the coil 600, the variable aperture may further include a power supply 610. The power supply 610 is electrically connected to the coil 600 through a coil wire 620, to supply power to the coil 600 by using the power supply 610. The variable aperture may further include a power supply carrier 630. The power supply 610 may be disposed in the power supply carrier 630, and the power supply carrier 630 provides an installation basis for the power source 610.

To implement a better light supplementing effect, the first light-supplementing element 300 may be of an annular structure, and the first light-supplementing element 300 is disposed at an edge position of the first light-transmitting substrate 110. Optionally, the first light-supplementing element 300 may be a light-emitting annular strip. In this case, the first light-supplementing element 300 may supplement light in all directions, to ensure that brightnesses in all directions of a shooting background are the same, preventing a poor image effect due to different brightnesses in different directions of the shooting background.

In a further technical solution, the variable aperture may further include a protective structural member 800. The protective structural member 800 may be a protective gasket, and the protective gasket may be sleeved on a side of the variable aperture. The protective gasket may fasten a shape of the variable aperture and prevent leakage of the light-transmitting fluid 210 and the light-shielding fluid 220 in the sealed chamber.

The variable aperture may further include a light-transmitting cover plate 700. The light-transmitting cover plate 700 covers the first light-transmitting substrate 110, to protect the first light-transmitting substrate 110. Optionally, the light-transmitting cover plate 700 may be a glass cover plate or a polymer resin cover plate.

Based on the variable aperture in the foregoing embodiment of this application, an embodiment of this application further discloses a camera module. The disclosed camera module may be used in an electronic device. The disclosed camera module includes the variable aperture in the foregoing embodiment, and the disclosed camera module further includes a lens 910, a driving motor 920, a photosensitive element 930, an optical filter 940, and a circuit board 950.

The variable aperture is disposed opposite to the lens 910, and the variable aperture is located on a light inlet side of the lens 910. An amount of entered light for the lens 910 is adjusted by adjusting a size of the aperture. The lens 910 includes a lens element and a lens barrel, and the lens element is disposed in the lens barrel.

The lens 910 is connected to the driving motor 920. The driving motor 920 may drive the lens 910 to move in an optical axis direction of the lens 910. The driving motor 920 is electrically connected to the circuit board 950, and the driving motor 920 is supplied with power and controlled by using the circuit board 950. Optionally, the camera module further includes a base 970. The base 970 is configured to support the driving motor 920.

A photosensitive surface of the photosensitive element 930 is opposite to the lens 910, so that light entering through the lens 910 may be incident into the photosensitive surface of the photosensitive element 930. Optionally, the photosensitive element 930 may be a CMOS (Complementary Metal Oxide Semiconductor, complementary metal oxide semiconductor), the photosensitive element 930 is electrically connected to the circuit board 950 through a photosensitive element wire 931, to supply power to and control the photosensitive element 930 by using the circuit board 950.

The optical filter 940 is disposed between the lens 910 and the photosensitive surface of the photosensitive element 930. The optical filter 940 can filter out stray light such as infrared light in light that enters the photosensitive element 930, to obtain a better imaging effect and improve quality of a shot image. Optionally, the camera module may further include an optical filter support 960. The optical filter 940 is disposed on the optical filter support 960, and the optical filter support 960 is disposed on the base 970.

Based on the camera module in the foregoing embodiment of this application, an embodiment of this application further discloses an electronic device. The disclosed electronic device includes the camera module in the foregoing embodiment.

To obtain a better shooting effect, the electronic device may further include a second light-supplementing element. The second light-supplementing element is configured to supplement light to the lens 910 in a large aperture shooting mode, to increase an amount of light through the lens 910, thereby improving a shooting effect. Because the large aperture mode may be used for shooting in an extreme night environment or shooting in a long distance, the second light-supplementing element has a higher intensity and power. Optionally, the second light-supplementing element may be a flashlight.

The electronic device disclosed in embodiments of this application may be a smartphone, a tablet computer, an e-book reader, or a wearable device. Of course, the electronic device may alternatively be another device. This is not limited in embodiments of this application.

The embodiments of this application are described above with reference to the accompanying drawings, but this application is not limited to the foregoing implementations, and the foregoing implementations are only illustrative and not restrictive. Under the enlightenment of this application, a person of ordinary skill in the art can make many forms without departing from the purpose of this application and the protection scope of the claims, all of which fall within the protection of this application.

The invention claimed is:

1. A variable aperture, comprising a first light-transmitting substrate, a second light-transmitting substrate, light-transmitting fluid, light-shielding fluid, a driving mechanism, and a first light-supplementing element, wherein the first light-transmitting substrate and the second light-transmitting substrate are disposed opposite to each other, a sealed chamber is disposed between the first light-transmitting substrate and the second light-transmitting substrate, the light-transmitting fluid and the light-shielding fluid are fluidly provided in the sealed chamber, and the light-transmitting fluid and the light-shielding fluid are immiscible with each other, the light-transmitting fluid and the light-shielding fluid are used to form a light-transmitting region and a light-shielding region, and the light-shielding region is disposed around the light-transmitting region;

the driving mechanism is configured to drive the light-transmitting fluid and the light-shielding fluid to flow, and when the light-transmitting fluid and the light-shielding fluid flow, an area of the light-transmitting region and an area of the light-shielding region may be changed; and in a case that the area of the light-transmitting region is less than a preset area, the first light-supplementing element emits light;

wherein the variable aperture further comprises a photocell, and the photocell is electrically connected to the first light-supplementing element;

wherein the photocell is disposed in the sealed chamber, the light-shielding fluid covers the photocell, when the light-shielding fluid flows, a light-absorbing surface of the photocell is enabled to be exposed outside the light-shielding fluid, in a case that the area of the light-transmitting region is smaller than the preset area, the photocell is exposed outside the light-shielding fluid, and the photocell receives ambient light to generate electric energy for the first light-supplementing element to emit light.

2. The variable aperture according to claim 1, wherein the sealed chamber comprises a first flow channel and a second flow channel, the first flow channel is close to the first light-transmitting substrate, the second flow channel is close to the second light-transmitting substrate, the first flow channel is in connection with the second flow channel, and the light-transmitting fluid and the light-shielding fluid are capable of flowing circularly between the first flow channel and the second flow channel.

3. The variable aperture according to claim 2, wherein a center of the light-transmitting region is located at a center of the variable aperture, in a case that the driving mechanism drives the light-transmitting fluid and the light-shielding fluid to flow, the light-transmitting fluid and the light-shielding fluid in the first flow channel flow in a direction away from the center of the variable aperture, and the light-transmitting fluid and the light-shielding fluid in the second flow channel flow in a direction close to the center of the variable aperture.

4. The variable aperture according to claim 2, wherein the driving mechanism is a coil, the coil is located in the sealed chamber, and at least one of the light-transmitting fluid or the light-shielding fluid is magnetic fluid; and in a case that the coil is in an electrified state, the coil magnetically cooperates with the magnetic fluid, to generate an electromagnetic force, the electromagnetic force drives the light-transmitting fluid to flow into the first flow channel, and the electromagnetic force drives the light-shielding fluid to flow into the second flow channel, to reduce an area of a region, perpendicular to a light incidence direction, in the light-transmitting region.

5. The variable aperture according to claim 4, wherein the light-transmitting fluid is distributed in a circle, the light-shielding fluid is distributed annularly, the light-transmitting fluid and the light-shielding fluid are disposed concentrically, the coil is an annular structure, and the coil and the light-shielding fluid are disposed concentrically.

6. The variable aperture according to claim 4, wherein the light-shielding fluid covers the coil.

7. The variable aperture according to claim 1, wherein the first light-supplementing element is an annular structure, and the first light-supplementing element is disposed at an edge position of the first light-transmitting substrate.

8. A camera module, comprising a variable aperture, a lens, a driving motor, a photosensitive element, an optical filter, and a circuit board, wherein the variable aperture is disposed opposite to the lens, the variable aperture is located on a light inlet side of the lens, wherein the variable aperture comprises a first light-transmitting substrate, a second light-transmitting substrate, light-transmitting fluid, light-shielding fluid, a driving mechanism, and a first light-supplementing element, wherein the first light-transmitting substrate and the second light-transmitting substrate are disposed opposite to each other, a sealed chamber is disposed between the first light-transmitting substrate and the second light-transmitting substrate, the light-transmitting fluid and the light-shielding fluid are fluidly provided in the sealed chamber, and the light-transmitting fluid and the light-shielding fluid are immiscible with each other, the light-transmitting fluid and the light-shielding fluid are used to form a light-transmitting region and a light-shielding region, and the light-shielding region is disposed around the light-transmitting region;

the driving mechanism is configured to drive the light-transmitting fluid and the light-shielding fluid to flow, and when the light-transmitting fluid and the light-shielding fluid flow, an area of the light-transmitting region and an area of the light-shielding region may be changed; and in a case that the area of the light-transmitting region is less than a preset area, the first light-supplementing element emits light;

wherein the variable aperture further comprises a photocell, and the photocell is electrically connected to the first light-supplementing element;

wherein the photocell is disposed in the sealed chamber, the light-shielding fluid covers the photocell, when the light-shielding fluid flows, a light-absorbing surface of the photocell is enabled to be exposed outside the light-shielding fluid, in a case that the area of the light-transmitting region is smaller than the preset area, the photocell is exposed outside the light-shielding fluid, and the photocell receives ambient light to generate electric energy for the first light-supplementing element to emit light;

the lens is connected to the driving motor, the driving motor is capable of driving the lens to move in a direction of an optical axis of the lens, and the driving motor is electrically connected to the circuit board; and the photosensitive element is disposed opposite to the lens, and the photosensitive element is electrically connected to the circuit board; and the optical filter is disposed between the lens and the photosensitive element.

9. The camera module according to claim 8, wherein the sealed chamber comprises a first flow channel and a second flow channel, the first flow channel is close to the first light-transmitting substrate, the second flow channel is close to the second light-transmitting substrate, the first flow channel is in connection with the second flow channel, and the light-transmitting fluid and the light-shielding fluid are capable of flowing circularly between the first flow channel and the second flow channel.

10. The camera module according to claim 9, wherein a center of the light-transmitting region is located at a center of the variable aperture, in a case that the driving mechanism drives the light-transmitting fluid and the light-shielding fluid to flow, the light-transmitting fluid and the light-shielding fluid in the first flow channel flow in a direction away from the center of the variable aperture, and the light-transmitting fluid and the light-shielding fluid in the second flow channel flow in a direction close to the center of the variable aperture.

11. The camera module according to claim 9, wherein the driving mechanism is a coil, the coil is located in the sealed chamber, and at least one of the light-transmitting fluid or the light-shielding fluid is magnetic fluid; and in a case that the coil is in an electrified state, the coil magnetically cooperates with the magnetic fluid, to generate an electromagnetic force, the electromagnetic force drives the light-transmitting fluid to flow into the first flow channel, and the electromagnetic force drives the light-shielding fluid to flow into the second flow channel, to reduce an area of a region, perpendicular to a light incidence direction, in the light-transmitting region.

12. The camera module according to claim 11, wherein the light-transmitting fluid is distributed in a circle, the light-shielding fluid is distributed annularly, the light-transmitting fluid and the light-shielding fluid are disposed concentrically, the coil is an annular structure, and the coil and the light-shielding fluid are disposed concentrically.

13. The camera module according to claim 11, wherein the light-shielding fluid covers the coil.

14. The camera module according to claim 8, wherein the first light-supplementing element is an annular structure, and the first light-supplementing element is disposed at an edge position of the first light-transmitting substrate.

15. An electronic device, comprising a camera module, wherein the camera module comprises a variable aperture, a lens, a driving motor, a photosensitive element, an optical filter, and a circuit board, wherein the variable aperture is disposed opposite to the lens, the variable aperture is located on a light inlet side of the lens, wherein the variable aperture comprises a first light-transmitting substrate, a second light-transmitting substrate, light-transmitting fluid, light-shielding fluid, a driving mechanism, and a first light-supplementing element, wherein the first light-transmitting substrate and the second light-transmitting substrate are disposed opposite to each other, a sealed chamber is disposed between the first light-transmitting substrate and the second light-transmitting substrate, the light-transmitting fluid and the light-shielding fluid are fluidly provided in the sealed chamber, and the light-transmitting fluid and the light-shielding fluid are immiscible with each other, the light-transmitting fluid and the light-shielding fluid are used to form a light-transmitting region and a light-shielding region, and the light-shielding region is disposed around the light-transmitting region;

the driving mechanism is configured to drive the light-transmitting fluid and the light-shielding fluid to flow, and when the light-transmitting fluid and the light-shielding fluid flow, an area of the light-transmitting region and an area of the light-shielding region may be changed; and in a case that the area of the light-transmitting region is less than a preset area, the first light-supplementing element emits light;

wherein the variable aperture further comprises a photocell, and the photocell is electrically connected to the first light-supplementing element;

wherein the photocell is disposed in the sealed chamber, the light-shielding fluid covers the photocell, when the light-shielding fluid flows, a light-absorbing surface of the photocell is enabled to be exposed outside the light-shielding fluid, in a case that the area of the light-transmitting region is smaller than the preset area, the photocell is exposed outside the light-shielding fluid, and the photocell receives ambient light to generate electric energy for the first light-supplementing element to emit light;

the lens is connected to the driving motor, the driving motor is capable of driving the lens to move in a direction of an optical axis of the lens, and the driving motor is electrically connected to the circuit board; and the photosensitive element is disposed opposite to the lens, and the photosensitive element is electrically connected to the circuit board; and the optical filter is disposed between the lens and the photosensitive element.

16. The electronic device according to claim 15, wherein the sealed chamber comprises a first flow channel and a second flow channel, the first flow channel is close to the first light-transmitting substrate, the second flow channel is close to the second light-transmitting substrate, the first flow channel is in connection with the second flow channel, and the light-transmitting fluid and the light-shielding fluid are capable of flowing circularly between the first flow channel and the second flow channel.

17. The electronic device according to claim 16, wherein a center of the light-transmitting region is located at a center of the variable aperture, in a case that the driving mechanism drives the light-transmitting fluid and the light-shielding fluid to flow, the light-transmitting fluid and the light-shielding fluid in the first flow channel flow in a direction away from the center of the variable aperture, and the light-transmitting fluid and the light-shielding fluid in the second flow channel flow in a direction close to the center of the variable aperture.

18. The electronic device according to claim 16, wherein the driving mechanism is a coil, the coil is located in the sealed chamber, and at least one of the light-transmitting fluid or the light-shielding fluid is magnetic fluid; and in a case that the coil is in an electrified state, the coil magnetically cooperates with the magnetic fluid, to generate an electromagnetic force, the electromagnetic force drives the light-transmitting fluid to flow into the first flow channel, and the electromagnetic force drives the light-shielding fluid to flow into the second flow channel, to reduce an area of a region, perpendicular to a light incidence direction, in the light-transmitting region.

19. The electronic device according to claim 18, wherein the light-transmitting fluid is distributed in a circle, the light-shielding fluid is distributed annularly, the light-transmitting fluid and the light-shielding fluid are disposed concentrically, the coil is an annular structure, and the coil and the light-shielding fluid are disposed concentrically.

20. The electronic device according to claim 18, wherein the light-shielding fluid covers the coil.

* * * * *